(12) United States Patent
Shaheen et al.

(10) Patent No.: US 7,287,070 B2
(45) Date of Patent: Oct. 23, 2007

(54) DETERMINING CONTROL OF AN INTERNET COMMUNICATION BETWEEN A SENDER AND RECEIVER

(75) Inventors: Kamel M. Shaheen, King of Prussia, PA (US); Brian G. Kiernan, Voorhees, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 571 days.

(21) Appl. No.: 10/034,425

(22) Filed: Dec. 27, 2001

(65) Prior Publication Data

US 2002/0178247 A1 Nov. 28, 2002

Related U.S. Application Data

(60) Provisional application No. 60/293,798, filed on May 25, 2001.

(51) Int. Cl.
*G06F 15/173* (2006.01)
(52) U.S. Cl. .................. 709/223; 709/226; 370/348
(58) Field of Classification Search ............. 709/227, 709/238, 247, 223, 228, 224, 226, 246; 370/348, 370/231, 354; 455/437
See application file for complete search history.

(56) References Cited

U.S. PATENT DOCUMENTS

| 6,031,832 | A * | 2/2000 | Turina ................... 370/348 |
|---|---|---|---|
| 6,385,451 | B1 * | 5/2002 | Kalliokulju et al. ....... 455/437 |
| 6,487,595 | B1 * | 11/2002 | Turunen et al. .......... 709/226 |
| 6,529,497 | B1 * | 3/2003 | Hjelm et al. ............. 370/347 |
| 6,584,098 | B1 * | 6/2003 | Dutnall ................... 370/354 |
| 6,608,832 | B2 * | 8/2003 | Forslow .................. 370/353 |
| 6,621,793 | B2 * | 9/2003 | Widegren et al. ........ 370/230.1 |
| 6,654,610 | B1 * | 11/2003 | Chen et al. .............. 455/450 |
| 6,708,034 | B1 * | 3/2004 | Sen et al. ................ 455/445 |
| 6,819,937 | B2 * | 11/2004 | Knuutila et al. .......... 455/522 |
| 6,937,566 | B1 * | 8/2005 | Forslow .................. 370/231 |
| 2001/0026554 | A1 | 10/2001 | Holler et al. |
| 2001/0027490 | A1 * | 10/2001 | Fodor et al. ............. 709/238 |
| 2001/0052017 | A1 | 12/2001 | Chen |
| 2002/0032800 | A1 * | 3/2002 | Puuskari et al. ........ 709/246 |

(Continued)

FOREIGN PATENT DOCUMENTS

EP 1032179 A1 2/1999

OTHER PUBLICATIONS

Rfc 2205; www.ietf.org/rfc/rfc2205.txt.*

(Continued)

*Primary Examiner*—Thong Vu
(74) *Attorney, Agent, or Firm*—Volpe and Koenig, P.C.

(57) ABSTRACT

The present invention provides a new communication mechanism between the UE and the GGSN pertaining to Resource Reservation Protocol (RSVP) signaling, and coordinates and assigns responsibility for RSVP messaging. This ensures proper RSVP messaging, prevents unnecessary consumption of radio resources and reduces chances of collisions within the network. Also, the invention prevents the possibility that neither the UE nor GGSN respond appropriately to the RSVP requirements by halting transmission of any RSVP path/refreshment messages to the IP network in order to refresh/maintain the reservation states due to lack of clear assignment of responsibility. This lack of clear understanding between the UE and the GGSN may result in the expiration of the IP network resource reservations made earlier for media streams.

10 Claims, 13 Drawing Sheets

U.S. PATENT DOCUMENTS

| | | | |
|---|---|---|---|
| 2002/0036983 | A1 | 3/2002 | Widegren et al. |
| 2002/0062379 | A1* | 5/2002 | Widegren et al. ............ 709/227 |
| 2002/0071427 | A1* | 6/2002 | Schneider et al. .......... 370/352 |
| 2002/0133600 | A1* | 9/2002 | Williams et al. ............. 709/228 |
| 2002/0152305 | A1* | 10/2002 | Jackson et al. ............. 709/224 |
| 2005/0091409 | A1* | 4/2005 | Williams et al. ............ 709/247 |

OTHER PUBLICATIONS

Resource Reservation Protocol (RSVP);www.vinayks.com/cisco/RSVP-45.pdf.*

8A-2 A Simple QoS Signaling Protocol for Mobile Hosts in the Integrated Services Internet www.ieee-infocom.org/1999/papers/08a_02.pdf.*

Session Initiation Protocol in 3G; keskus.hut.fi/opetus/s38130/k01/Papers/Sipila-SIPin3G.pdf.*

Interest in relation of Diffserv, RSVP, and Intserv www.ietf.org/proceedings/98dec/slides/rsvp-wroclawski-98dec.pdf.*

A Framework for QoS & Mobility in the Internet Next Generation—Karagiannis, al. www.ub.utwente.nl/webdocs/ctit/1/00000024.pdf.*

Performance and architecture of SGSN and GGSN of general packet radio service (GPRS) Mishra, A.; Global Telecommunications Conference, 2001. Globecom '01. IEEE vol. 6, Nov. 25-29, 2001 pp. 3494-3498 vol. 6.*

Wireless Internet Access based on GPRS—Kalden, Meirick, Meyer (2000) www.stephan-baucke.de/publications/mme/PCM_4_2000.pdf.*

IP-Based Access Network Infrastructure for Next-Generation . . . —Ramjee, al. (2000) ntrg.cs.tcd.ie/htewari/papers/ramjee_2000.pdf.*

Packet Mode in Wireless Networks: Overview of Transition to..—Sarikaya (2000) www.cs.kau.se/cs/prtp/papers/sarikaya.pdf.gz.*

* cited by examiner

DETERMINING CONTROL OF AN INTERNET COMMUNICATION BETWEEN A SENDER AND RECEIVER

This application claims priority to U.S. Provisional Patent Application No. 60/293,798, filed on May 25, 2001.

BACKGROUND

The present invention relates to communications between a user equipment (UE) and a network of a wireless communication system. More specifically, the present invention relates to resource reservation protocol (RSVP) signaling in such a system.

RSVP signaling is used to make reservations for multimedia traffic originated or terminated in wireless systems. It is used to ensure the integrity and Quality of Service (QoS) for these services, especially in communications that are carried across external internet protocol (IP) networks. RSVP signaling can be originated by the UE and carried across the radio frequency (RF) interface toward the wireless network into an IP network, or it can be generated by the general packet radio service gateway support node (GGSN) which acts as RSVP proxy server on behalf of the UE. In the first case, the UE performance of RSVP signaling will consume a considerable portion of the air interface resources which can be avoided by implementing the Proxy operation in the GGSN. When the proxy function is performed by the GGSN, a negotiation mechanism is needed between the GGSN and the UE to ensure the proper operation and avoid any race conditions, where both entities simultaneously transmit RSVP signaling. A controlling module should be available to assign the RSVP signaling function, if necessary. This control module could reside in the GGSN or it can reside in the Policy control function (PCF). Lacking a clear assignment of RSVP responsibility may result in either a race condition, where both entities transmit simultaneously, or lack of any transmission of RSVP path and refresh messages to update the reservation state in routers along the reservation path. This lack of refreshment messages will result in the expiration of the reservation states and loss of allocated resources.

SUMMARY

The present invention addresses the possibility of a race condition that arises due to lack of a communication mechanism between the UE and the GGSN, saving unnecessary consumption of radio resources and reducing chances of collisions within the network. Also, the invention prevents the possibility that neither the UE nor GGSN respond appropriately to the Resource Reservation Protocol (RSVP) requirements by halting transmission of any RSVP path/refreshment messages to the IP network in order to refresh/maintain the reservation states due lack of clear assignment of responsibility. This lack of clear understanding between the UE and the GGSN may result in the expiration of the IP network resource reservations made earlier for media streams. This scenario can occur with a higher probability in the absence of this dialog.

BRIEF DESCRIPTION OF THE DRAWING(S)

DETAILED DESCRIPTION OF THE PREFERRED EMBODIMENT(S)

Figure 1:
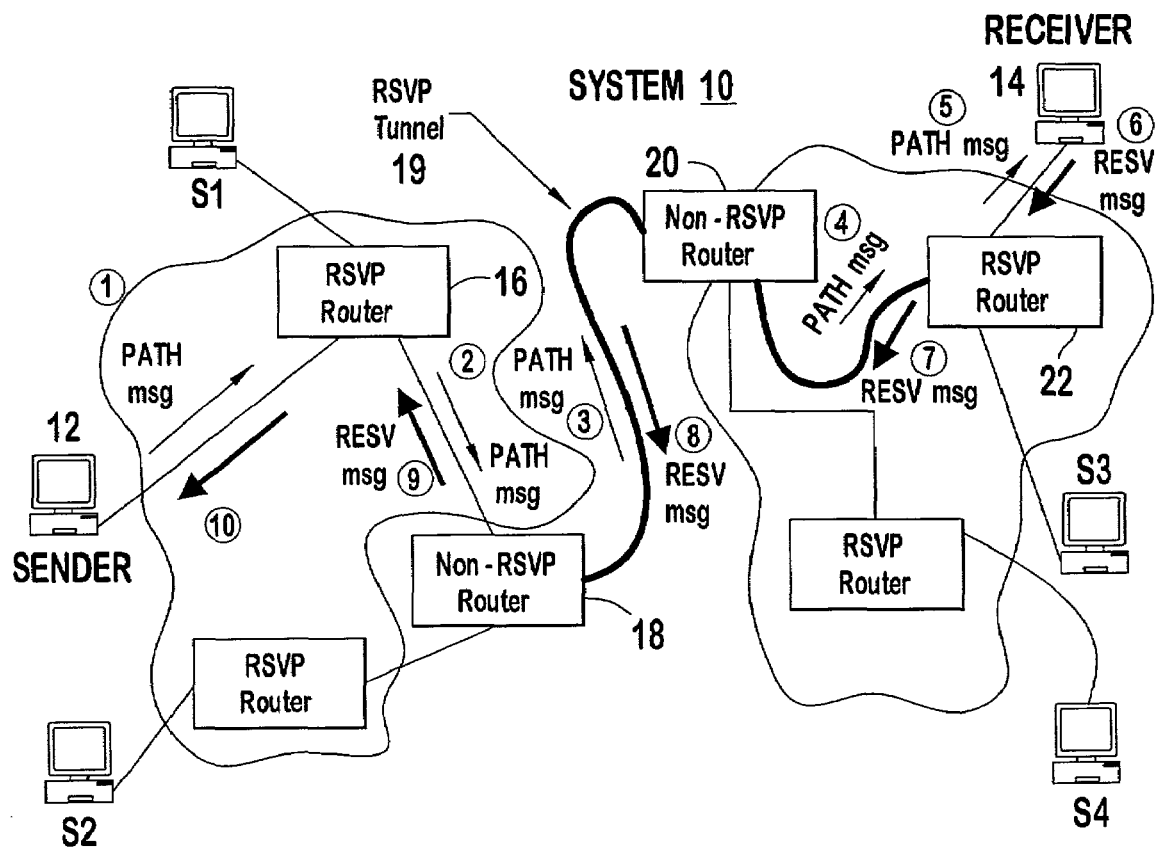
FIG. 1 is an example of an RSVP signaling mechanism.

FIG. 1 shows a system 10 utilizing a RSVP basic operation (illustrated for simplicity in a wired environment). One user (sender 12) initiates a multimedia session with a second user (i.e., receiver 14) and tries to reserve the resources to establish the session, although other subscribers to the system (S1-S4) are shown. The example given here is limited to subscribers 12, 14 for purposes of simplicity. The RSVP protocol is used to go through the specified route of the requested session and make a reservation to ensure the quality of service (QoS) necessary to carry the session. The RSVP Sender 12 transmits a PATH message (see path 1, 2, 3, 4 and 5) through a RSVP router 16, non-RSVP router 18, RSVP tunnel 19, non-RSVP router 20 and RSVP router 22 to allocate the resources along the routing path and store the media attributes necessary for the session. The Receiver end 14 acknowledges the PATH message with a reservation (RESV) message to establish the resources (see path 6, 7, 8, 9 and 10). The RESV message is sent through RSVP router 22, non-RSVP router 20, RSVP tunnel 19, non-RSVP router 18 and RSVP router 16. Once the RESV message is received at sender 12, a final acknowledgment (not shown) is sent back to the receiver 14 using the same path. After receipt of the final acknowledgment, both sides start the session. Periodically, the Sender and the receiver sides will refresh the resource reservation along the routing path through RSVP refresh messages. Otherwise, the reservation state in routers across the path will expire and resources will be re-allocated.

Figure 2:
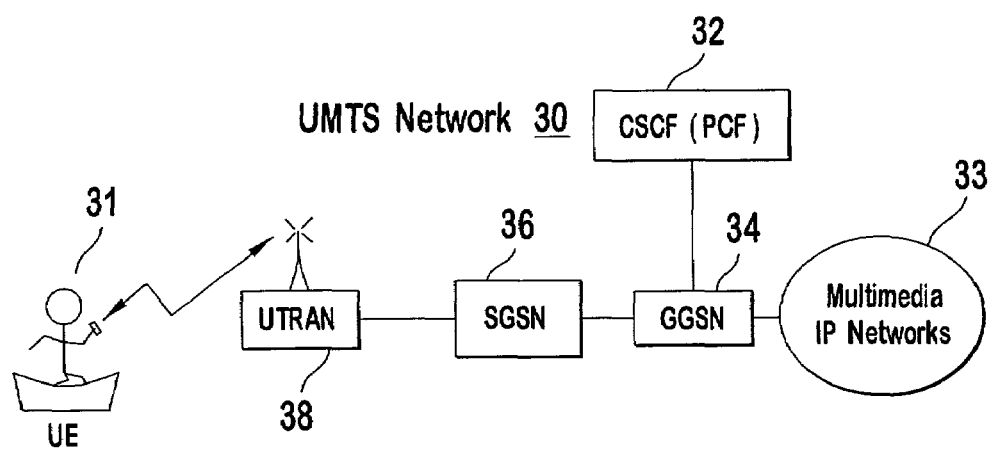
FIG. 2 is a simplified diagram of a wireless network.

For a wireless network, the user equipments 31 or users are connected to the multimedia/IP network 33 through a wireless network as shown in FIG. 2. FIG. 2 shows the essential parts of a wireless network, such as a universal mobile terrestrial system (UMTS) network 30, that are involved in the RSVP operations. As shown, the Call Server Control Function (CSCF) policy control function (PCF) 32 acts as the policy control point where decisions are made regarding the user services, the handling of media streams and QoS resource issues. The GGSN 34 represents the gateway function, which potentially acts as the RSVP Send/Receive proxy. Also, the GGSN 34 contains all the mobile profile information packet data protocol (PDP) context, and has the resources necessary to carry both signaling and traffic information. The GGSN 34 acts as the controlling authority for all mobile activities. It assigns the IP address and decides, with the serving GPRS support node (SGSN)

36, the potential modes of operation. The RSVP signaling is transparent to both the UMTS terrestrial radio access network (UTRAN) 38 and SGSN 36. The decision point and the associated control logic on the manner and location of handing the RSVP signaling is preferably located at either the CSCF (PCF) 34 in association with the overall QoS policy control or at the GGSN 34 with other resource control functions. In an alternative embodiment, a dynamic allocation of responsibility of the RSVP signaling to the CSCF (PCF) 32 and GGSN 34 is provided since the GGSN 34 is in control of most of the network resources and can detect (or determine) a situation where the wireless network is congested and use this mechanism to alleviate some of the excess traffic.

In one embodiment, the GGSN 34 decides whether it or the UE 31 will perform the RSVP function. To prevent a race condition, multiple or no transmissions, the GGSN 34 interacts with the UE and clearly assigns the responsibilities for RSVP signaling. The decision may be made statically or dynamically. If the decision is made statically, the decision is made only at the time of initiation. If the decision is made dynamically, the GGSN 34 may change who performs the RSVP function at any time. This decision is typically based on local traffic conditions, such as the availability of air link resources versus the availability of network resources, and local policy. To illustrate, if air link resources are scarce, the GGSN 34 may decide to switch the RSVP function from some UEs to itself. By contrast, if the GGSN's resources are being highly utilized, it may shift the RSVP function to some of the UEs.

Figure 3:
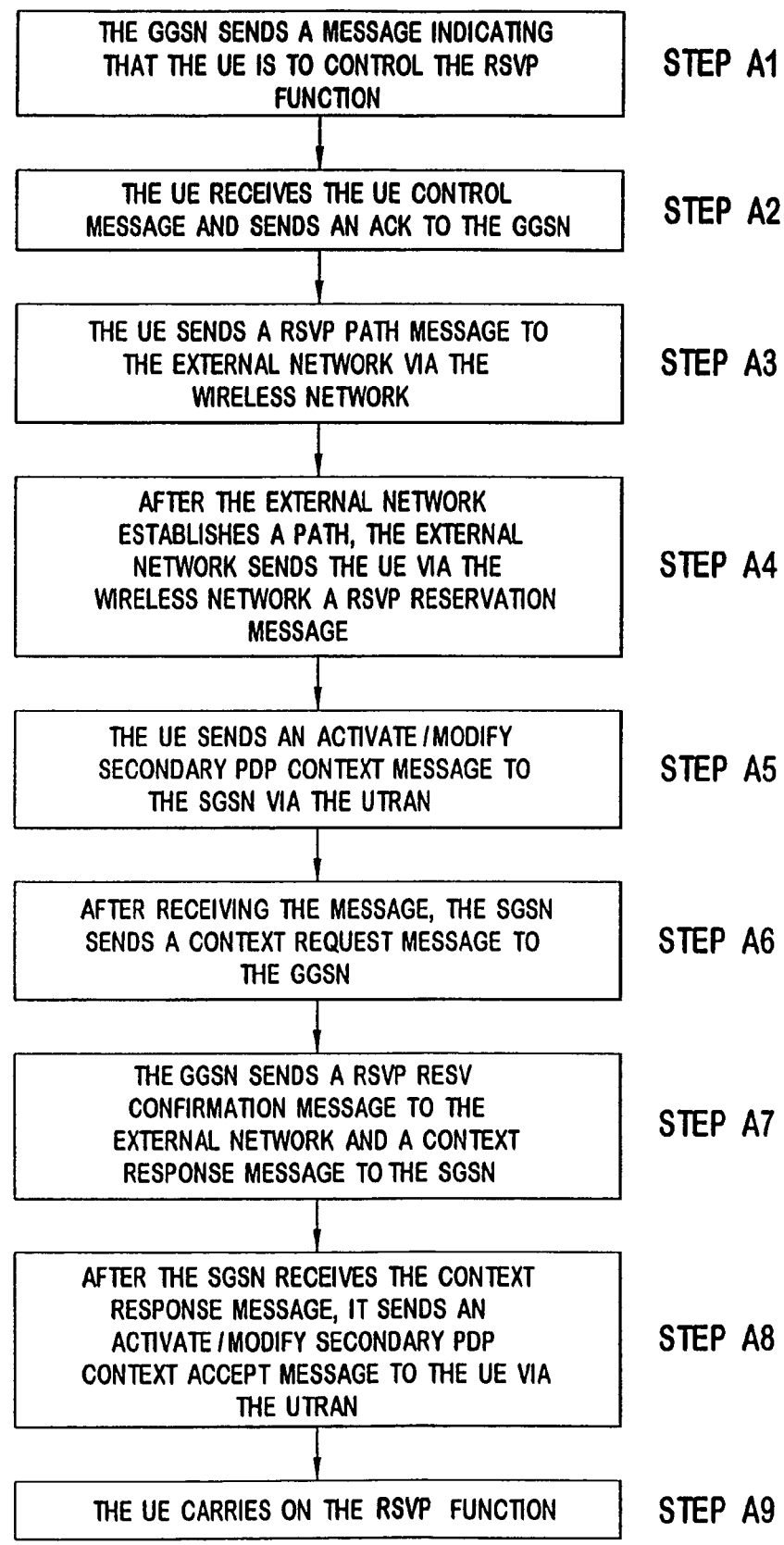
FIGS. 3 and 4 are flow charts illustrating the GGSN assigning the RSVP function.

A flow chart indicating a preferred procedure for the GGSN 34 to assign the RSVP function to the UE 31 is illustrated in FIG. 3. After the GGSN 34 determines that the UE 31 will perform the RSVP function, it sends the UE 31 a message indicating that the UE 31 controls the RSVP function via the wireless network, step A1. After the UE 31 receives that message, it sends an acknowledgment message (ACK) to the GGSN 34, step A2. To reserve a path to the destination user, the UE 31 sends a reservation path message (PATH message) to the external network 33 through the wireless network 30, step A3. After the external network 33 receives the PATH message, it reserves those resources for the UE 31 and sends the UE 31 back through the wireless network 30 a RSVP reservation (RESV) message, step A4. After the UE 31 receives the RSVP reservation message, it sends an activate/modified secondary Packet Data Protocol (PDP) context message to the SGSN 36 via the UTRAN 38, step A5. After receiving that message, the SGSN 36 sends a context request message to the GGSN 34, step A6. In response to receiving the context request message, the GGSN 34 sends a RESV confirmation message to the external network 33 and a context response message to the SGSN 36, step A7. After the SGSN receives the context response message, it sends an activate/modify secondary PDP context accept message to the UE 31, step A8. After the UE receives the acceptance message, it carries on the RSVP function, step A9.

To maintain the path throughout the external network 33, the UE 31 must periodically send a refresh path message through the external network 33. The refreshing prevents components of the external network 33 from timing out and releasing the resources. After the external network 33 receives the refresh path message, it maintains its reservation of the path and sends the UE 31 a refresh reservation message indicating that the path will be maintained.

In an alternate embodiment, although the GGSN 34 makes the RSVP function assignment, the UE 31 may accept or reject the assignment. This procedure allows for negotiation between the UE 31 and GGSN 34. After receiving the message from the GGSN 34 indicating that the UE 31 should perform the RSVP function, the UE 31 responds by accepting or rejecting, such as by an acknowledgment (ACK) or negative acknowledgment (NAK). If the UE 31 rejects the assignment, the UE 31 does not originate any RSVP messages and the GGSN 34 performs the RSVP proxy function.

Figure 4:
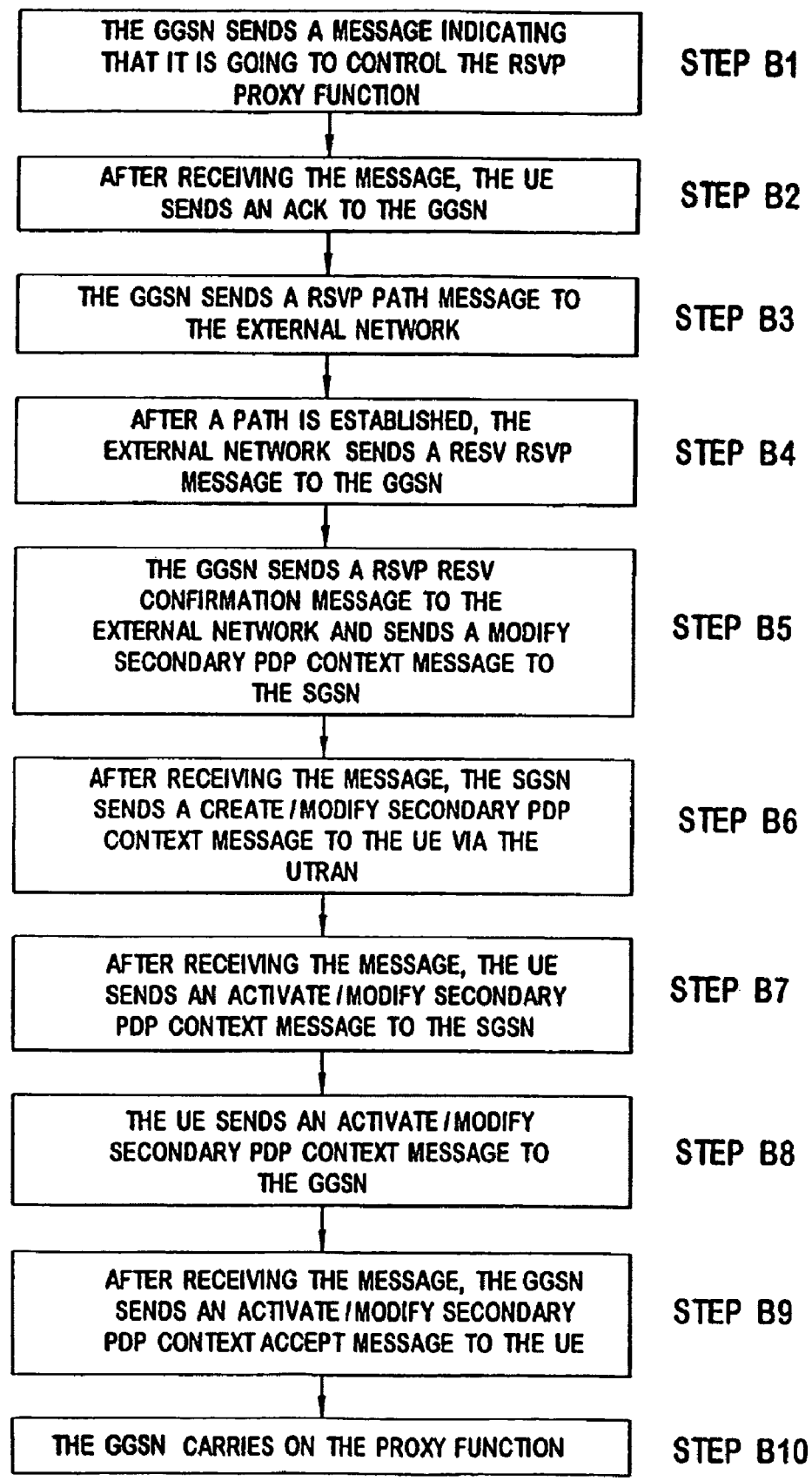

A flow chart indicating a preferred procedure for the GGSN 34 to assign the RSVP function to itself is illustrated in FIG. 4. After the GGSN 34 determines that it will perform the proxy function, it sends the UE 31 a message indicating that the GGSN 34 will control the RSVP function via the wireless network 30, step B1. After the UE 31 receives that message, it sends an acknowledgment message to the GGSN 34, step B2. To reserve a path through the external network 33, the GGSN 34 sends a PATH message to the external network 33, step B3. After the external network 33 receives the PATH message, it reserves path resources and sends the GGSN 34 a RSVP reservation message, step B4. After the GGSN 34 receives the RSVP reservation message, it sends a RSVP reservation confirmation message to the external network 33. At the same time, it sends a modify secondary PDP context message to the SGSN 36, step B5. After the SGSN 36 receives that message, it sends a create/modify secondary PDP context message to the UE 31 via the UTRAN 38, step B6. In response to receiving the message, the UE 31 sends an activate/modify secondary PDP context message to the SGSN 36 and GGSN 34, steps B7 and B8. After receiving that message, the GGSN 34 sends an activate/modify secondary PDP context accept message to the UE 31 and carries on the RSVP function, steps B9 and B10. To maintain the path through the external network, the GGSN 34 periodically sends a refresh path message through the external network 33.

In another embodiment, the PCF 32 decides whether the GGSN 34 or the UE 31 will perform the RSVP function. This decision may also be made statically or dynamically. If the decision is made statically, the decision is made at the time of initiation. If the decision is made dynamically, the PCF 32 may change who performs the RSVP function at any time. Alternately, the PCF 32 may delegate the decision to the GGSN 34. After the PCF 32 sends a delegation message to the GGSN 34, the GGSN 34 decides who performs the RSVP function.

Figure 5:
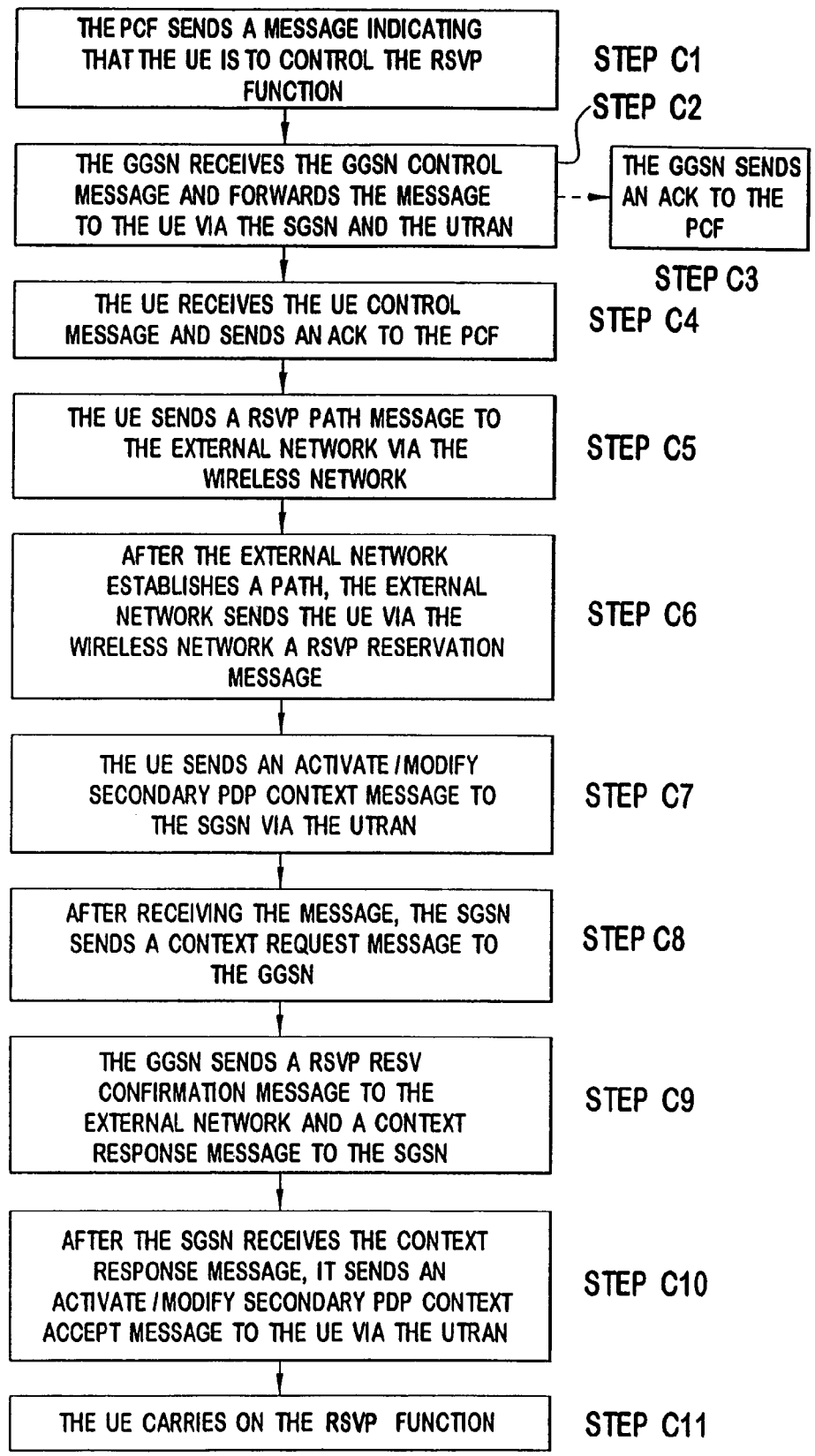
FIGS. 5 and 6 are flow charts illustrating the PCF assigning the RSVP function.

A flow chart indicating a preferred procedure for the PCF 32 to assign the RSVP function to the UE 31 is illustrated in FIG. 5. After the PCF 32 determines that the UE 31 will perform the RSVP function, it sends the GGSN 34 a message indicating that the UE 31 controls the RSVP function, step C1. The GGSN 34 forwards the message to the UE 31 via the wireless network 33, step C2, and optionally acknowledges receipt of the message by sending an acknowledgment (ACK) to the PCF 32, step C3. After the UE 31 receives the forwarded message, it also sends an ACK to the PCF 32, step C4. Alternately, the GGSN 34 does not send an ACK. The PCF 32 treats the ACK from the UE 31 as acknowledging receipt from both the UE 31 and GGSN 34.

The UE 31 also sends a PATH message to the external network 33, step C5. After the external network 33 receives the PATH message, it reserves those resources for the UE 31 and sends the UE 31 back through the wireless network 30 an RSVP reservation message, step C6. After the UE 31 receives the RSVP reservation message, it sends an activate/modify secondary PDP context message to the SGSN 36 via the UTRAN 38, step C7. In response to receiving that message, the SGSN 36 sends a context request message to the GGSN 34, step C8. Subsequently, the GGSN 34 sends an RSVP space reservation confirmation message to the external network 33 and a context response message to the SGSN 36, step C9. After the SGSN 36 receives a context response message, it sends an activate/modify secondary PDP context accept message to the UE 31 via the UTRAN 38, step C10. At that point, the UE 31 carries on the RSVP function, step C11. Periodically, the UE 31 sends refresh messages to the external network 33 to maintain the path through the external network 33.

Figure 6:
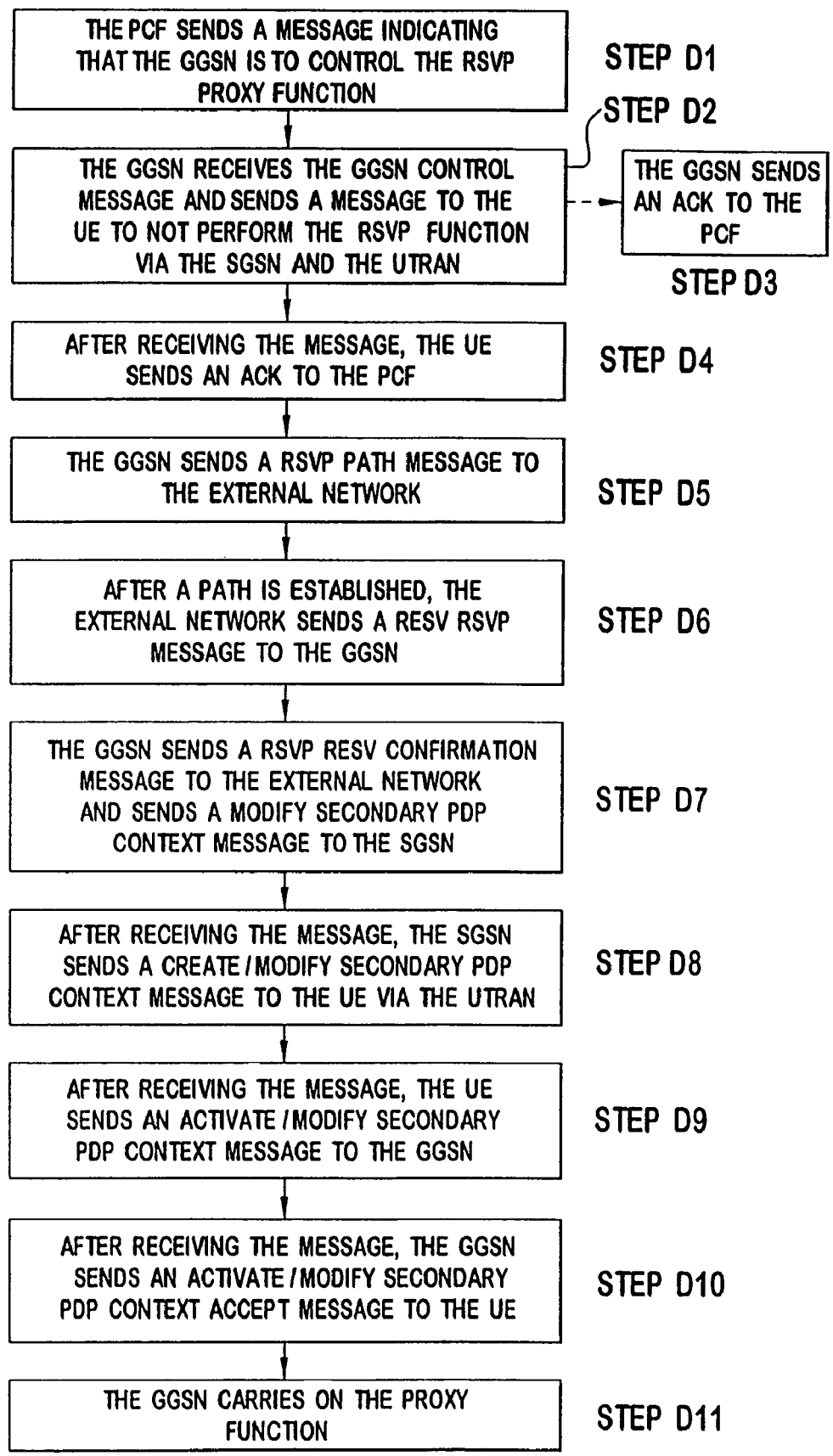

A flow chart indicating a preferred procedure for the PCF 32 to assign the RSVP function to the GGSN 34 is illustrated in FIG. 6. After the PCF 32 determines that the GGSN 34 will perform the RSVP function, it sends the GGSN 34 a message indicating that the GGSN 34 controls the RSVP function, step D1. After the GGSN 34 receives that message, it sends a message via the SGSN 36 and the UTRAN 38 to the UE 31 indicating that the UE 31 should not perform the RSVP function, step D2. Optionally, the GGSN 34 also acknowledges receipt of the control message by sending an ACK to the PCF 32, step D3. After the UE 31 receives the message, it also sends an ACK to the PCF 32, step D4. Alternately, the GGSN 34 does not send an ACK. The PCF 32 treats the ACK from the UE 31 as acknowledging receipt from both the UE 31 and GGSN 34.

To reserve a path through the external network 33, the GGSN 34 sends a PATH message to the external network 33, step D5. After the external network receives the PATH message, it reserves PATH resources and sends the GGSN 34 an RSVP reservation message, step D6. In response to the GGSN 34 receiving the RSVP message, it sends an RSVP reservation confirmation message to the external network 33. Simultaneously, it sends a modified secondary PDP context message to the SGSN 36, step D7. After receiving that message, the SGSN 36 sends a create/modify secondary PDP context message to the UE 31 via the UTRAN 38, step D8. After receiving that message, the UE 31 sends an activate/modify secondary PDP context message to the GGSN 34, step D9. In response to receiving that message, the GGSN 34 sends an activate/modify secondary PDP context accept message to the UE 31 and the GGSN 34 carries on the RSVP function, steps D10 and D11. To maintain the path throughout the external network, the GGSN 34 periodically sends a refresh path message through the external network 33.

In another embodiment, the UE 31 and GGSN 34 negotiate responsibility for the RSVP signaling, for how long, and under what circumstances the responsibilities can shift. Either the UE 31 or GGSN 34 may initiate the negotiations.

In another embodiment, the PCF 32 is used in conjunction with the UE policy enforcement so that the PCF 32 assigns the responsibilities to either the UE 31 or the GGSN 34. The PCF in this case sends two orders: one to the GGSN 34 and the second to the UE 31. This prevents a race condition or no transmission from occurring. The wireless network may also be hard coded to only allow either the GGSN 34 or UE 31 to perform the RSVP function. The decision is communicated to the UE 31 during the PDP context activation process.

FIGS. 7-14 illustrate some preferred signaling procedures between the UE 31, UTRAN 38, SGSN 36, GGSN 34, PCF 32 and external network 33 for differing signaling scenarios.

Figure 7:
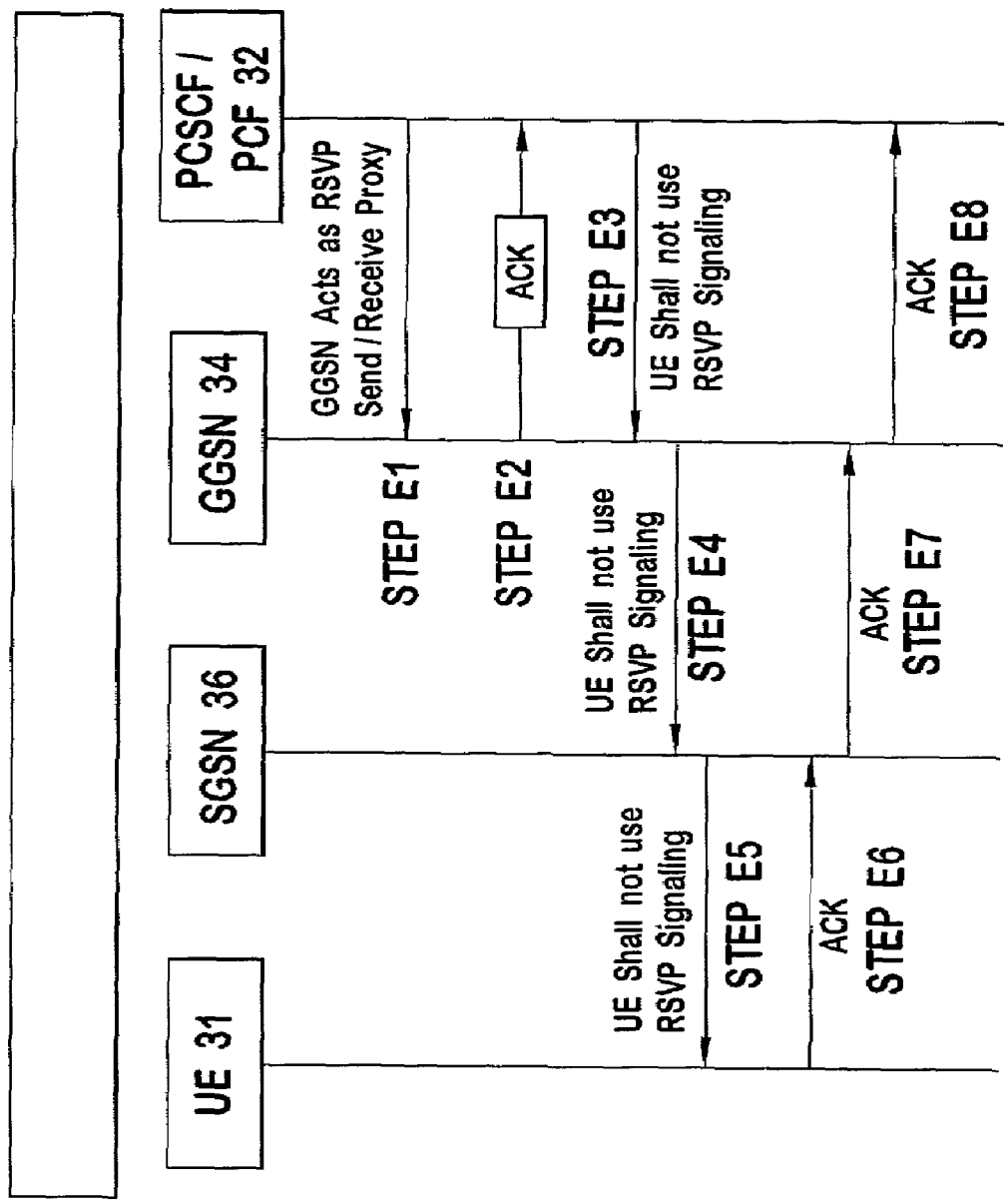
FIGS. 7 through 14 are flow charts illustrating preferred signaling scenarios.
Figure 8:
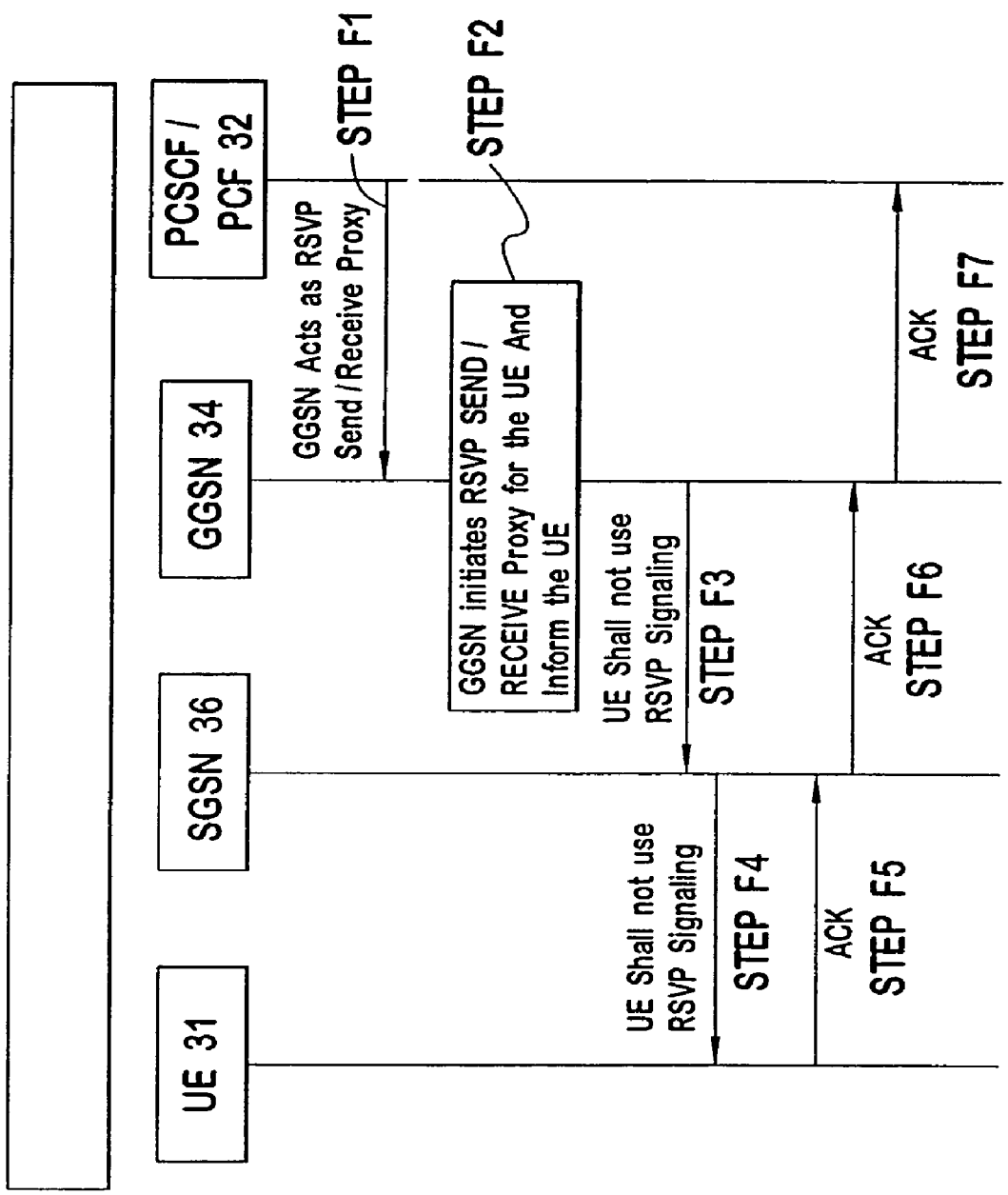

FIG. 7 illustrates one preferred signaling arrangement for PCF control of RSVP signaling. In FIGS. 7 and 8, the PCF 32 assigns control to the GGSN 34. The steps start at the top line of the figure and subsequent steps in time are represented at succeedingly lower positions beneath the top line. The direction of signaling is depicted by an arrow.

Initially, the proxy call state control function (PCSCF)/PCF 32 signals the GGSN 34 to act as the RSVP SEND/RECEIVE proxy, step E1. The GGSN 34 acknowledges, sending an ACK to the PCF 32, step E2. The PCF 32, step E3, communicates to the GGSN 34 that the UE 31 shall not use RSVP signaling. The GGSN 34, step E4, communicates this message to the SGSN 36. The SGSN 36, step E5, communicates this message to the UE 31. The UE 31 acknowledges this message and, step E6, communicates an ACK to the SGSN 36. The SGSN 36, step E7, communicates the ACK to the GGSN 34. The GGSN 34, step E8, communicates the ACK to the PCF 32.

In FIG. 8, the PCF 32, at step F1, communicates to the GGSN 34 that the GGSN 34 shall act as the RSVP SEND/RECEIVE proxy and the UE 31 should not use RSVP. The GGSN 34 initiates an RSVP SEND/RECEIVE proxy for the UE 31 and informs the UE 31 to not use RSVP, step F2. This is communicated to the SGSN 36, step F3, which, step F4, communicates it to the UE 31.

The UE 31, at step F5, sends an acknowledgment to the SGSN 36. The SGSN 36, step F6, communicates the acknowledgment to the GGSN 34 which, in turn, transmits the acknowledgment, step F7, to the PCF 32. The UE 31 does not send any RSVP messages until further notice.

Figure 9:
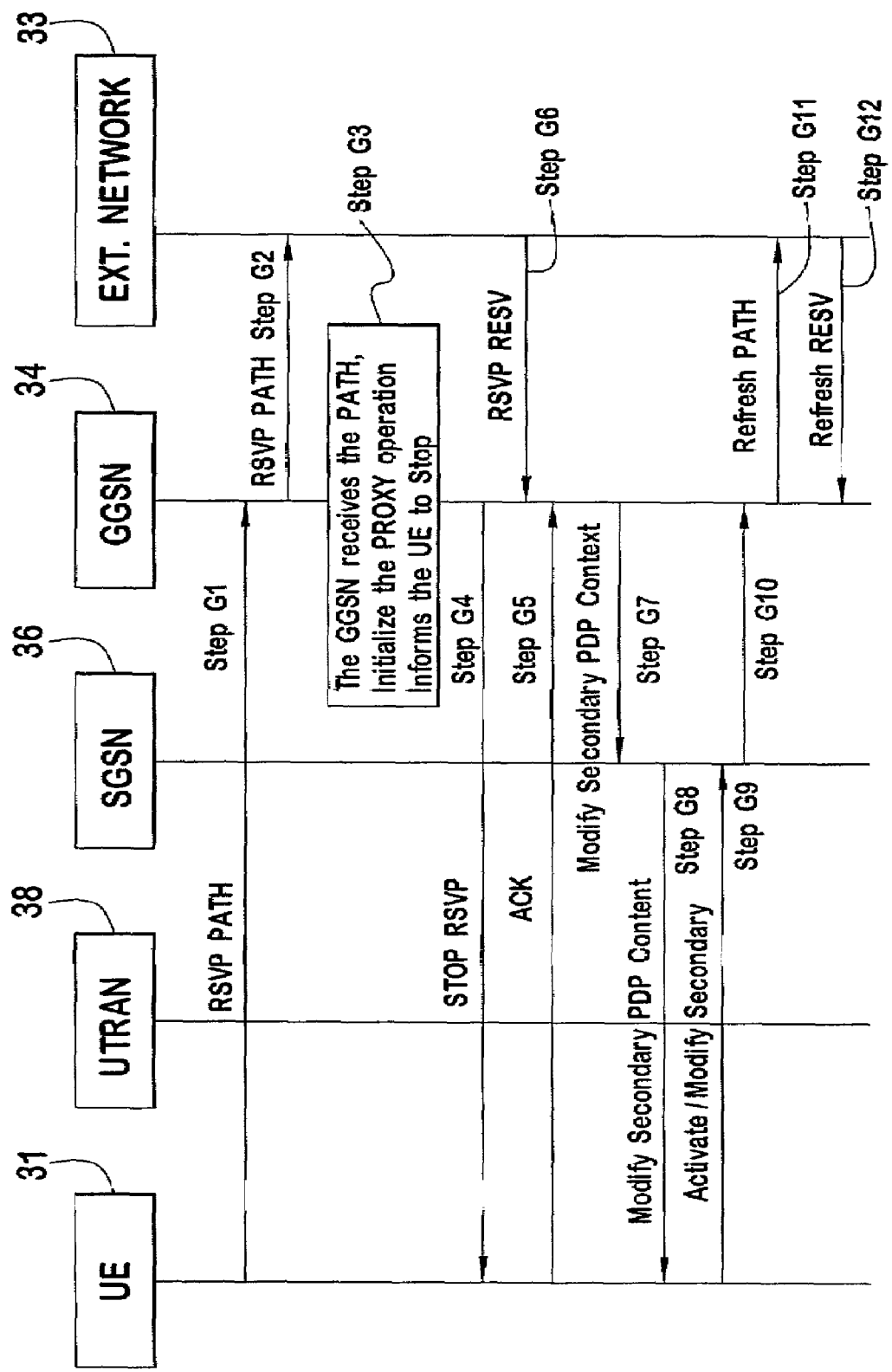
Figure 10:
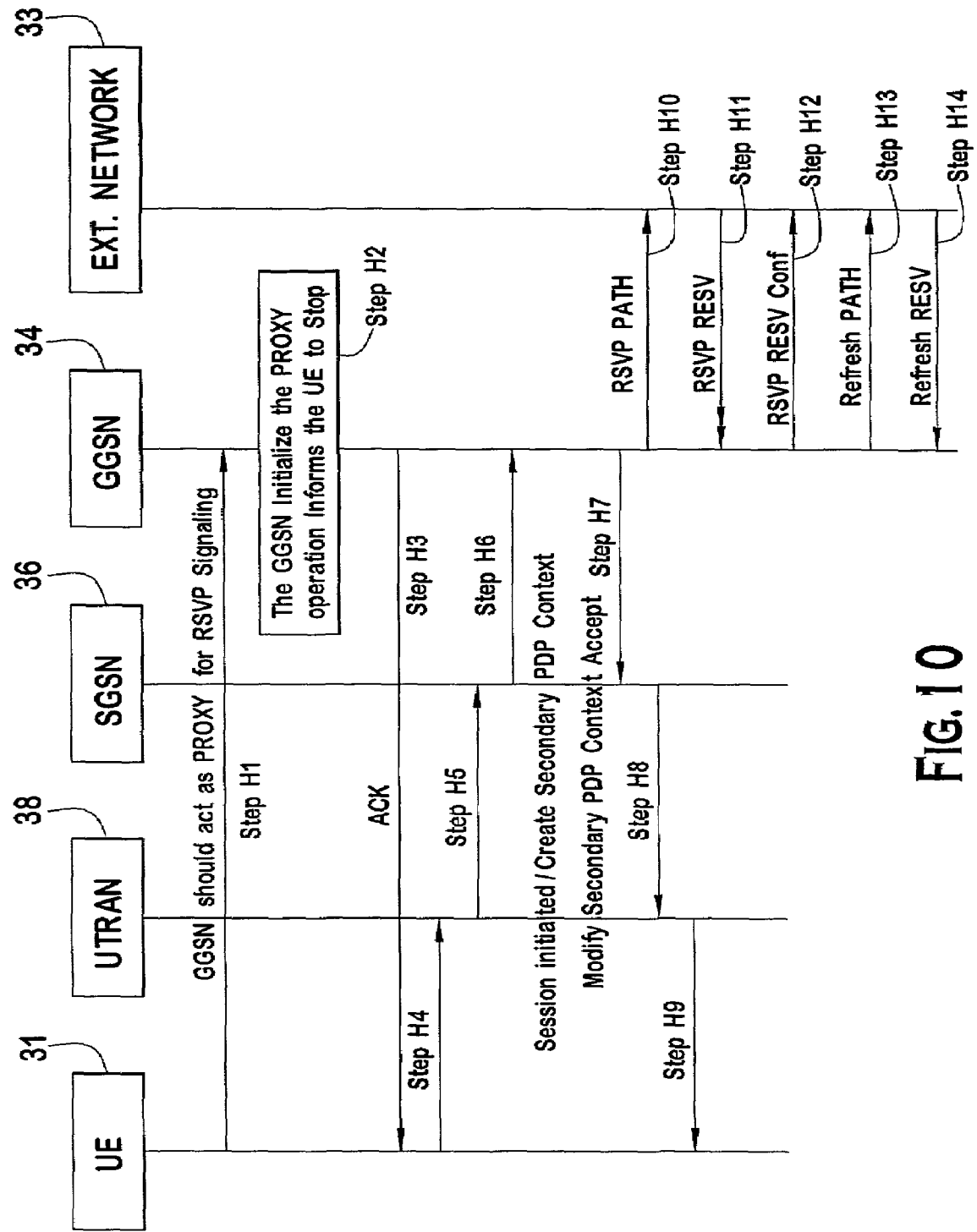

FIGS. 9 and 10 illustrate various signaling scenarios for the GGSN 34 deciding the responsibility for the RSVP proxy function. In FIG. 9, the GGSN 34 decides it will assume the RSVP proxy function. The UE 31, at step G1, transmits an RSVP PATH to the GGSN 34. The GGSN, step G2, initiates a path through the External Network 33 using a RSVP PATH message. The GGSN 34, step G3, upon receipt of the RSVP PATH from the UE 31, initializes the PROXY operation and informs the UE 31 to stop using a STOP RSVP message, step G4. The UE 31 sends an acknowledgment to the GGSN 34 through the UTRAN 38 and SGSN 36, step G5. The UE 31 does not initiate any RSVP messages until further notice from GGSN 34. After the GGSN 34 receives a RSVP RESV message from the external network 33, the GGSN 34 sends a Modify Secondary PDP Context message to the SGSN, step G7. The SGSN 36 sends that message to the UE 31, step G8. After the UE 31 receives the Modify Secondary PDP Context message, it sends an Activate/Modify Secondary PDP message to the SGSN 36, step G9. The SGSN 36 forwards that message to the GGSN 34, step G10. To maintain the path through the external network, the GGSN 34, periodically transmits a Refresh PATH message, step G11, and receives a Refresh RESV message, step G12.

In FIG. 10, the GGSN 34 decides to support the RSVP proxy function, after negotiation with the UE 31. The UE 31, step H1, transmits a message to the GGSN 34 indicating that it should act as proxy for RSVP signaling. The GGSN 34, which decides to support the Proxy operation, step H2, initializes the PROXY operation and informs the UE 31 to stop transmission, step H3. This decision is incorporated in an acknowledgment to the UE 31. The UE 31 accepts the GGSN order and stops sending RSVP messages.

The UE 31 initiates the session and, step H4, creates a secondary PDP context message which is transmitted to the GGSN 34 via the UTRAN 38 and SGSN 36, steps H5 and H6. The GGSN 34, step H7, modifies the secondary PDP context message and accepts the UE's communication and transmits the acceptance to the UE 31, through the same path, steps H8 and H9. The GGSN 34, step H10, transmits an RSVP PATH message to the external network 33 and receives a RSVP RESV in reply, step H11. The GGSN 34, step H12, confirms receipt of the RSVP RESV by sending a RSVP RESV confirmation. To maintain the path, the GGSN 34 periodically sends a Refresh PATH message, step H13, and, in turn, receives a Refresh RESV message, step H14.

Figure 11:
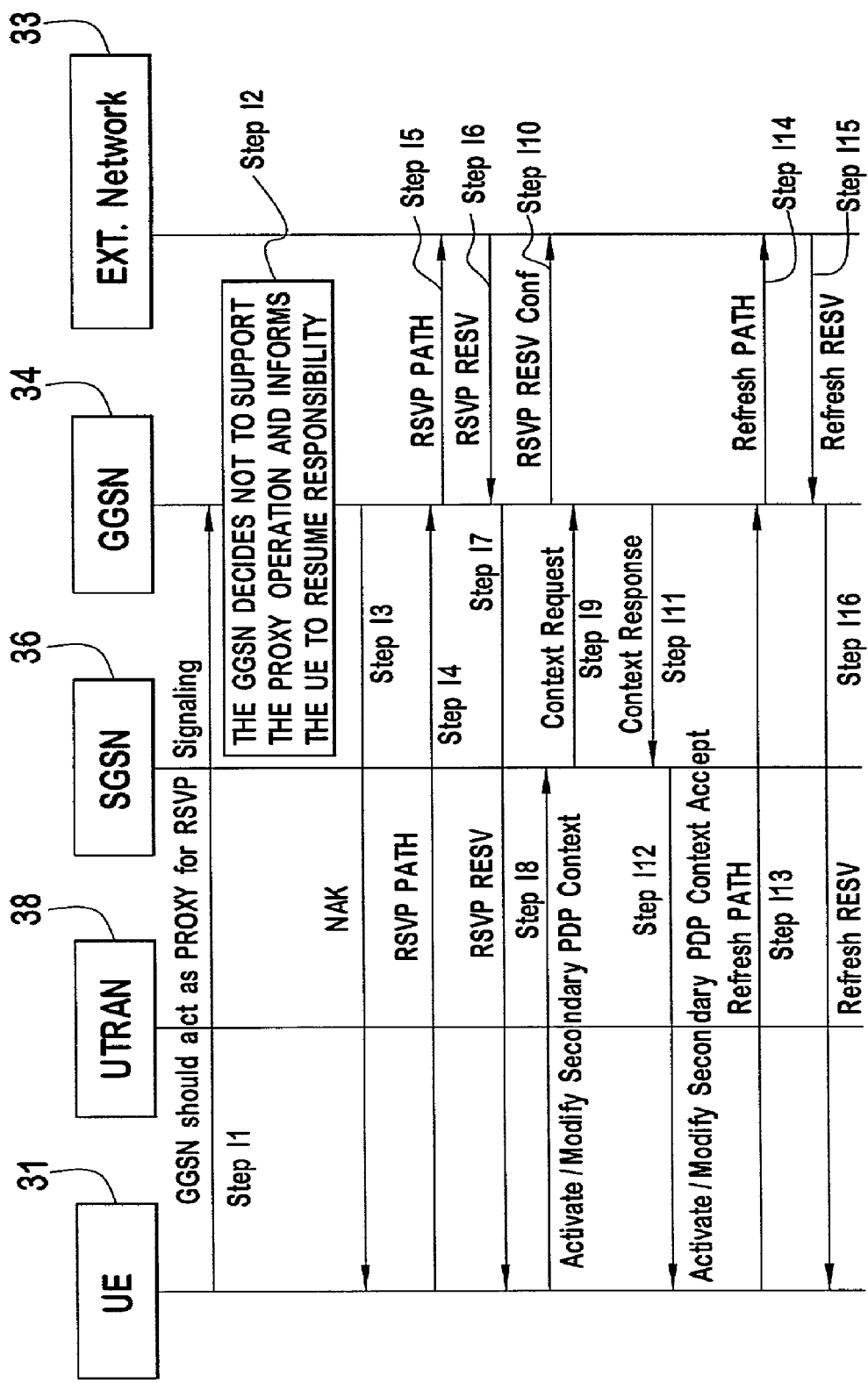

The UE 31 and GGSN 34 may engage in a negotiation as to who shall take the responsibility for RSVP signaling, for how long and under what circumstances the responsibilities can shift. In FIG. 11, the UE 31, at step I1, requests that the GGSN 34 acts as proxy for RSVP Signaling. The GGSN 34, step I2, decides that it will not support the PROXY operation and, step I3, informs the UE 31 to resume responsibility by transmitting a NAK. The UE 31, step I4, transmits an RSVP PATH message to the GGSN 34. The RSVP PATH message is transmitted, step I5, to the External Network 33. The external network 33 transmits an RSVP RESV to the GGSN 34, step I6. In turn, the GGSN 34 transmits the RSVP RESV to the UE 31, step I7 and a RSVP RESV confirmation message to the external network, step I10. The UE 31, step I8, transmits an Activate/Modify secondary PDP Context to the SGSN 36. The SGSN 36, step I9 transmits a Context request to the GGSN 34. At step I11, the GGSN 34 transmits a Context Response to the SGSN 36 which sends an Activate/Modify Secondary PDP Context Accept message, step I12, to the UE 31. The UE 31, to maintain the path, transmits, step I13, a refresh message, which is communicated to the GGSN 34. This refresh path message is transmitted by the GGSN 34, step I14, to the External Network 33. The External Network 33, responds to the GGSN 34 with a Refresh RSVP, step I15. The GGSN 34, step I16, transmits this message to the UE 31.

The GGSN 34 may also send messages to the UE 31 indicating that the GGSN 34 recommends that either the UE 31 or GGSN 34 perform the RSVP function. The UE 31 may either accept or decline the recommendation. Typically, the final determination of who performs the RSVP function, if negotiation is unsuccessful, is left to the GGSN 34.

Figure 12:
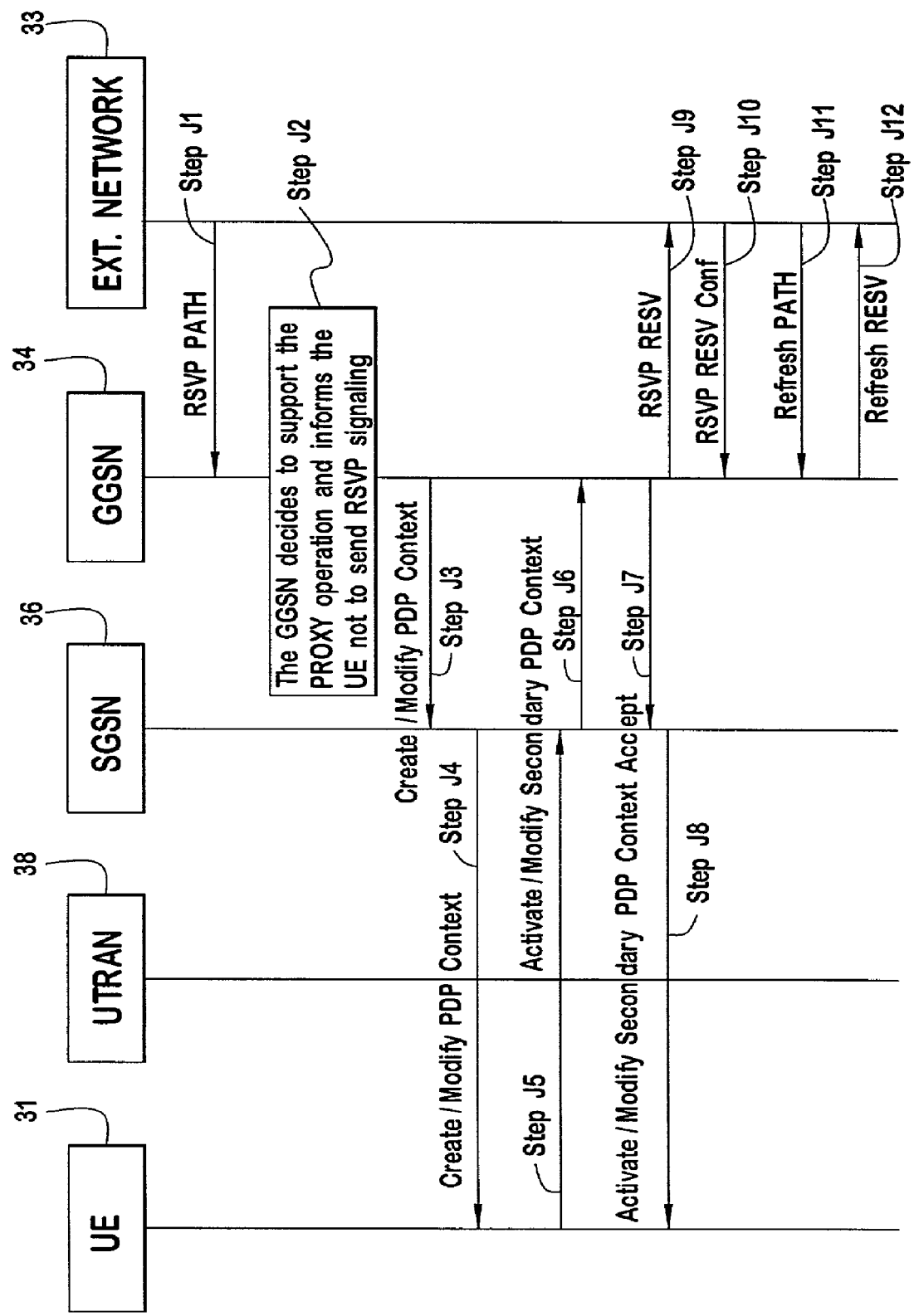

In FIG. 12, the GGSN 34 decides to support the proxy operation. The External Network 33, step J1, transmits an RSVP PATH message to the GGSN 34 from a UE in the External Network 33. The GGSN 34, step J2, decides to support the proxy operation and informs the UE 31 not to send RSVP signaling. The GGSN 34, step J3 transmits a Create/Modify PDP Context to the SGSN 36 which, step J4, transmits this message to the UE 31. The UE 31 receives this message and, step J5, transmits an Activate/Modify Secondary PDP Context to the SGSN 36. The SGSN 36, step J6, transmits this message to the GGSN 34.

The GGSN 34, step J7, transmits an Activate/Modify Secondary PDP Context Accept to the SGSN 36, which, step J8, transmits this message to the UE 31. In addition, the GGSN 34, step J9, transmits an RSVP RESV to the External Network 33 which responds with an RSVP RESV Confirmation, step J10. The UE associated with the External Network 33, step J11, transmits, through the External Network 33 to the GGSN 34, a Refresh Path Request message. The GGSN 34 responds by sending a Refresh RESV message, step J12.

Figure 13:
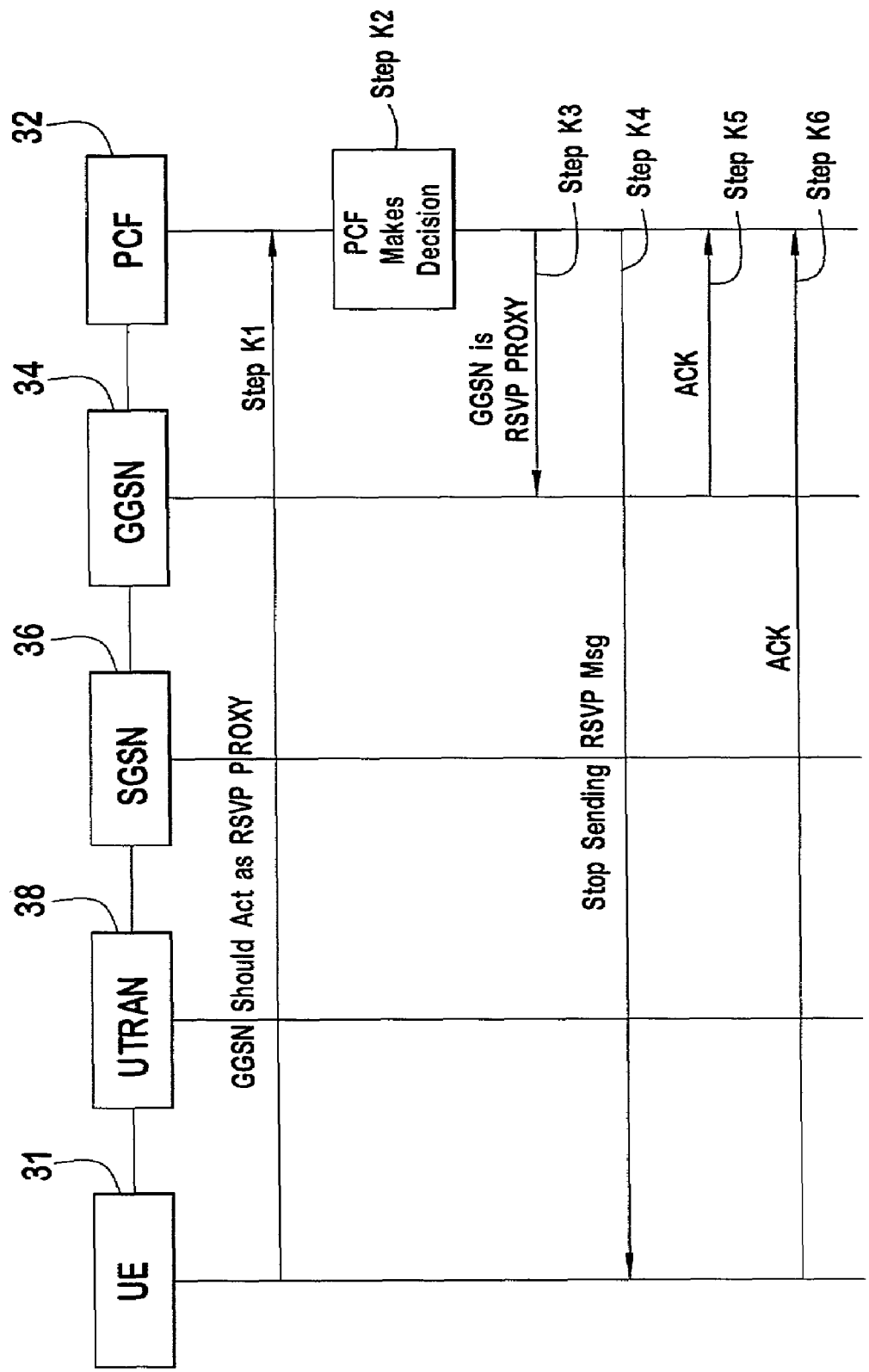

In FIG. 13, the PCF 32 makes the RSVP function decisions. The UE 31, step K1, sends a request that the GGSN 34 should act as RSVP PROXY to the PCF 32. This message is handled by the PCF 32 which, step K2 makes a decision and, step K3 advises the GGSN 34 that it is assigned the responsibility for the RSVP proxy. The PCF 32, step K4, further advises the UE 31 that it should stop sending RSVP messages. The GGSN 34, step K5, acknowledges its assignment to the PCF 32 and the UE 31, step K6, also acknowledges that it will stop sending RSVP messages.

Figure 14:
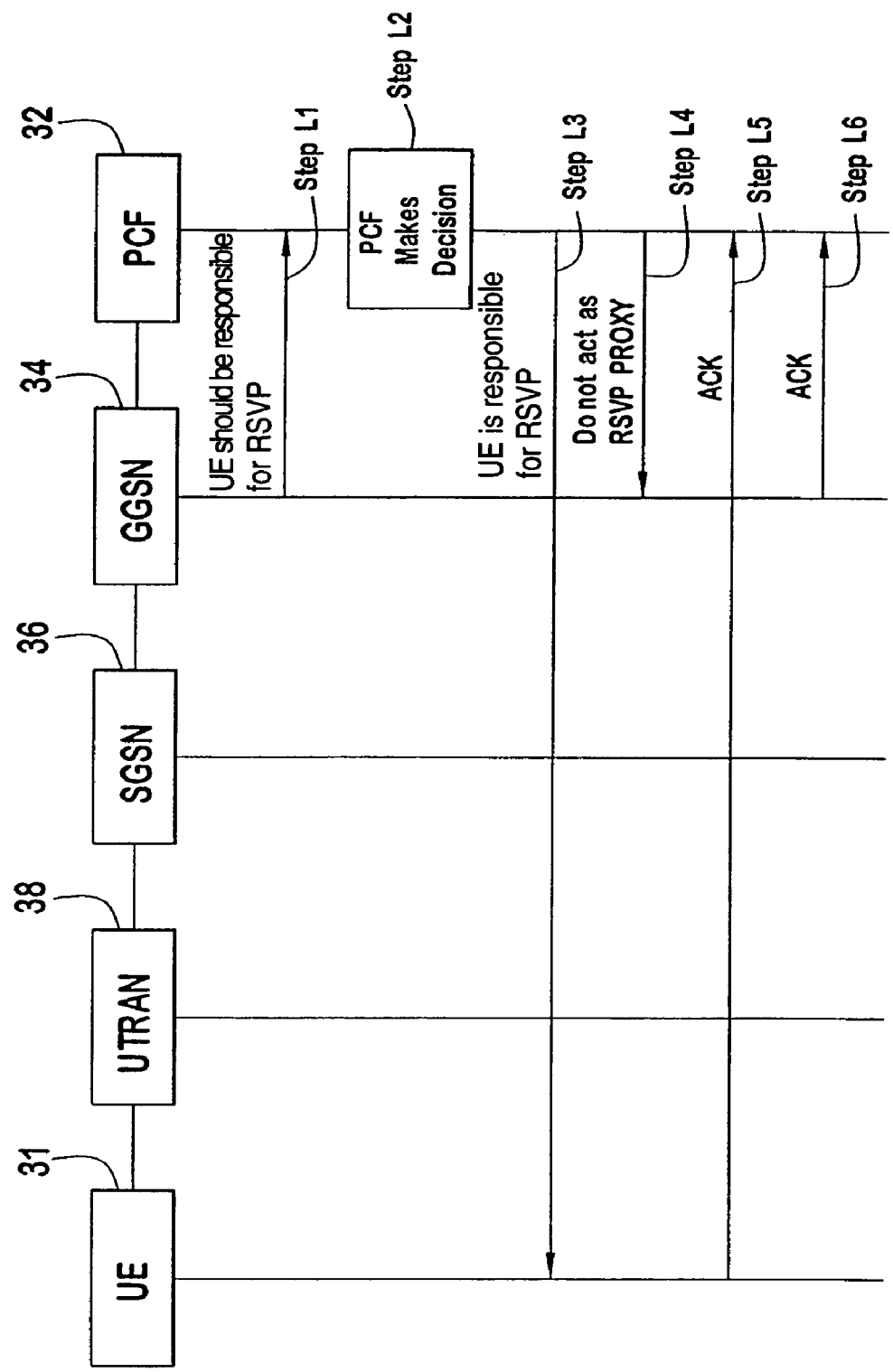

FIG. 14 is an arrangement similar to FIG. 13 except that the GGSN 34 sends a request to the PCF 32 that the UE 31 should be responsible for RSVP, step L1. The PCF 32, step L2, makes a decision and assigns the RSVP responsibility to the UE 31, step L3. The PCF 32 further instructs the GGSN 34 that it not act as RSVP proxy, step L4. The UE 31 acknowledges its assignment, step L5, and the GGSN 34 acknowledges its assignment, step L6.

It should be understood that the PCF can make the reverse decisions to those shown in FIGS. 13 and 14. For example, considering FIG. 13, when the UE 31 requests that the GGSN 34 should act as RSVP proxy, the PCF 32 may decide that the UE 31 should be responsible for RSVP anyway. In a similar fashion, making to reference to FIG. 14, the PCF 32 in response to a request from the GGSN 34 that the UE 31 should be responsible for RSVP, may decide that the GGSN 34 act as the RSVP proxy anyway. Since, in FIGS. 13 and 14, the PCF 32 sends an order to both the UE 31 and GGSN 34, that a race condition or no transmission at all will occur condition will not occur.

To assure that no RSVP signaling occurs during static set up (initialization), a control mechanism is preferably used that instructs the UE 31 not to send RSVP signaling messages while allocating the responsibility to the GGSN 34 or alternatively, the control mechanism instructs the GGSN 34 not to send RSVP signaling messages while allocating the responsibility to the UE 31.

What is claimed is:

1. A method for a general packet radio service gateway (GGSN) to dynamically assign responsibility for controlling resource reservation protocol (RSVP) in order to support multimedia communications between a user equipment (UE) in a wireless communication network and a user of an external network, the method comprising:
   determining whether the GGSN or the UE will perform the RSVP signaling;
   if the GGSN determines the UE will perform the RSVP signaling;
      the GGSN, sends the UE a message indicating that the UE will control the RSVP function; and
      the UE signals the external network in order to reserve a path through the external network;
   if the GGSN determines the GGSN will perform the RSVP signaling;
      the GGSN sends the UE a message indicating that the GGSN will control the RSVP function; and
      the GGSN signals the external network in order to reserve a path through the external network; and
   dynamically reallocating control of the RSVP function to either the GGSN or the UE.

2. The method of claim 1 wherein control is dynamically reallocated based on traffic conditions.

3. The method of claim 1 wherein control is dynamically reallocated based on the availability of air link resources versus the availability of network resources.

4. The method of claim 1 wherein control is dynamically reallocated based on local policy.

5. The method of claim 1 wherein the step of the UE signaling the external network in order to reserve a path through the external network further includes the steps of:
   the UE sending a reservation path message to the external network through the wireless network;
   the external network reserving path resources for the UE; and
   the external network sending the UE a RSVP reservation message back through the wireless network.

6. The method of claim 1 wherein the step of the GGSN signaling the external network in order to reserve a path through the external network, further includes the steps of:
   the GGSN sending a reservation path message to the external network through the wireless network;
   the external network reserving path resources for the GGSN; and
   the external network sending the GGSN a RSVP reservation message back through the wireless network.

7. The method of claim 1 further comprising:
   the UE periodically sending a path refresh message through the external network; and
   upon receipt of the path refresh message, the external network maintaining its reservation of the path.

8. The method of claim 1 further comprising:
   the external network sending a UE a refresh reservation message indicating that the path will be maintained.

9. The method of claim 1 further comprising:
   the UE periodically sending a path refresh message through the external network; and
   upon receipt of the path refresh message, the external network maintaining its reservation of the path.

10. The method of claim 1 further comprising:
    the external network sending a UE a refresh reservation message indicating that the path will be maintained.

* * * * *

UNITED STATES PATENT AND TRADEMARK OFFICE
CERTIFICATE OF CORRECTION

PATENT NO. : 7,287,070 B2  Page 1 of 1
APPLICATION NO. : 10/034425
DATED : October 23, 2007
INVENTOR(S) : Shaheen et al.

It is certified that error appears in the above-identified patent and that said Letters Patent is hereby corrected as shown below:

IN THE SPECIFICATION

Column 1, line 61, after the word "due", insert --to--.

At column 4, line 43, after the words "B9 and", delete "B1O" and insert therefor --B10--.

At column 5, line 24, after the words "38, step", delete "C1O" and insert therefor --C10--.

At column 8, line 58, before the words "a race", delete "that".

At column 8, lines 58 & 59, after the word "transmission", delete "at all will occur".

IN THE CLAIMS

Col. 10 Lines 24-31 Delete claims 9 & 10. Claims 9 & 10 are a duplicate copy of claims 7 & 8.

Signed and Sealed this

Twentieth Day of May, 2008

JON W. DUDAS
*Director of the United States Patent and Trademark Office*